(12) United States Patent
Cambou et al.

(10) Patent No.: US 11,552,810 B2
(45) Date of Patent: Jan. 10, 2023

(54) PUF WITH DISSOLVABLE CONDUCTIVE PATHS

(71) Applicant: Arizona Board of Regents on Behalf of Northern Arizona University, Flagstaff, AZ (US)

(72) Inventors: Bertrand Francis Cambou, Flagstaff, AZ (US); Raul Chipana Quispe, Flagstaff, AZ (US); Bilal Babib, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 287 days.

(21) Appl. No.: 16/493,263

(22) PCT Filed: Jul. 20, 2018

(86) PCT No.: PCT/US2018/043139
§ 371 (c)(1),
(2) Date: Sep. 11, 2019

(87) PCT Pub. No.: WO2019/027702
PCT Pub. Date: Feb. 7, 2019

(65) Prior Publication Data
US 2020/0169423 A1    May 28, 2020

Related U.S. Application Data

(60) Provisional application No. 62/541,005, filed on Aug. 3, 2017.

(51) Int. Cl.
*H04L 9/32* (2006.01)
*G06F 21/60* (2013.01)
*G11C 13/00* (2006.01)

(52) U.S. Cl.
CPC .......... *H04L 9/3278* (2013.01); *G06F 21/602* (2013.01); *G11C 13/0004* (2013.01);
(Continued)

(58) Field of Classification Search
CPC ............ G11C 13/0004; G11C 13/0007; G11C 13/0069; G11C 13/0059
See application file for complete search history.

(56) References Cited

U.S. PATENT DOCUMENTS 10,103,895 B1 * 10/2018 Tseng ................... H04L 9/0866
2015/0220273 A1   8/2015 Sun et al.
(Continued)

*Primary Examiner* — Han Yang
(74) *Attorney, Agent, or Firm* — Quarles & Brady LLP

(57) ABSTRACT

The generation of "fingerprints", also called challenge-response pairs (CRPs) of Physically Unclonable Functions (PUFs), can often stress electronic components, leaving behind traces that can be exploited by crypto-analysts. A non-intrusive method to generate CRPs based on Resistive RAMs may instead be used, which does not disturb the memory cells. The injection of small electric currents (magnitude of nanoAmperes) in each cell causes the resistance of each cell to drop abruptly by several orders of magnitudes through the formation of temporary conductive paths in each cell. A repeated injection of currents into the same cell, results in an almost identical effect in resistance drop for a single cell. However, due to the small physical variations which occur during manufacturing, the cells are significantly different from each other, in such a way that a group of cells can be used as a basis for PUF authentication.

18 Claims, 10 Drawing Sheets

(52) U.S. Cl.
   CPC ...... *G11C 13/0007* (2013.01); *G11C 13/0011* (2013.01); *G11C 13/0069* (2013.01); *G11C 2013/0078* (2013.01); *G11C 2013/0083* (2013.01); *G11C 2213/15* (2013.01); *G11C 2213/79* (2013.01)

(56) References Cited

U.S. PATENT DOCUMENTS

| | | |
|---|---|---|
| 2015/0318041 A1 | 11/2015 | Hwang et al. |
| 2016/0148679 A1* | 5/2016 | Yoshimoto ........... G11C 13/004 365/148 |
| 2017/0046129 A1* | 2/2017 | Cambou ................. G06F 7/588 |
| 2017/0048072 A1 | 2/2017 | Cambou |
| 2017/0345490 A1* | 11/2017 | Yoshimoto ........... G11C 13/004 |

* cited by examiner

PUF WITH DISSOLVABLE CONDUCTIVE PATHS

CROSS REFERENCE TO RELATED APPLICATIONS

This application is a U.S. National Stage of PCT Application No. PCT/US18/43139 filed on Jul. 20, 2018, which claims priority to U.S. Provisional Application No. 62/541,005 filed on Aug. 3, 2017, the entire contents of which is incorporated herein by reference.

FILED OF THE INVENTION

The present invention relates to physically unclonable functions used for security and access control in computers.

BACKGROUND

Physically Unclonable Functions (PUFs) act as a virtual "DNA"s or "fingerprint" of the hardware, and can be used as cryptographic primitives during authentication protocols and access control. PUFs exploit the intrinsic manufacturing variations introduced during fabrication of microelectronic devices such as critical dimensions, doping level of semiconducting layers, and threshold voltages. These variations distinguish each device from each other. The underlying mechanism of PUFs is a generator of challenge-response pairs (CRP), the challenges have been generated upfront as reference and are often stored in secure servers, and the responses are generated during the authentication protocols. The challenges and responses are then compared during the authentication process. The authentication is positive when the rate of matching pairs is statistically high enough. There is an expectation of randomness and secrecy that should make PUFs hard to extract by third party and thereby easy to use for secure authentication.

SUMMARY

In accordance with an example embodiment, a method of generating a physically unclonable function response may include exposing each cell of a random access memory array to an electric field to form temporary dissolvable conductive paths in dielectric material between electrodes of each of a plurality of resistive random access memory cells in the random access memory array, measuring the resistances of each of the plurality of resistive random access memory cells along the temporary conductive paths, assigning a parameter value of zero to resistive random access memory cells with resistance measurements within a first predefined resistance threshold range, assigning a parameter value of one to resistive random access memory cells with resistance measurements within a second predefined resistance threshold range that is higher than the first predefined resistance threshold range, and generating a data stream of parameter values, each parameter value representing one of the plurality of resistive random access memory cells, the data stream being used to generate a physically unclonable function response that uniquely identifies the random access memory array.

In another embodiment, the method may include assigning an arbitrary parameter value to resistive random access memory cells with resistance measurements within a third predefined resistance threshold range that is between the first and second predefined resistance threshold ranges, and assigning the arbitrary parameter value to resistive random access memory cells with resistance measurements above a predefined upper resistance threshold range that is above the second predefined resistance threshold range, wherein the data stream is a ternary data stream.

In another embodiment, for a given resistive random access memory cell of the plurality of resistive random access memory cells, the electric field may be generated by applying a gradually increasing electric current to at least one of the electrodes of the given resistive random access memory cell.

In another embodiment, the resistance of the given resistive random access memory cell along a temporary conductive path of the temporary conductive paths for the given resistive random access memory cell may be related to the electric current applied to the given resistive random access memory cell.

In another embodiment, the method may include forming, in each of the plurality of resistive random access memory cells, permanent filaments by applying a forming voltage to each resistive random access memory cell of the plurality of resistive random access memory cells. The temporary conductive paths may be formed extending from the permanent filaments.

In another embodiment, the random access memory array may be a conductive bridge random access memory array, a memristor memory array, or a phase change memory array.

In another embodiment, a temporary conductive path of the temporary conductive paths for a given resistive random access memory cell of the plurality of resistive random access memory cells may be formed between a top electrode and a bottom electrode of the given resistive random access memory cell, the temporary conductive being a path formed from metallic positive ions such as copper or silver, elements with oxygen vacancies, crystallographic defects or doping elements, and a dielectric material manufactured with chalcogenide, tantalum oxide, silicon dioxide, hafnium oxide, or other solid electrolyte material.

In accordance with an example embodiment, a system may include a secure server, and an electronic device communicatively coupled to the secure server. The electronic device may include an array of resistive random access memory cells and a secure processor coupled to the array. The secure processor may be configured to execute instructions for causing a current to be applied to each of the resistive random access memory cells to form temporary dissolvable conductive paths in dielectric material between electrodes of each of the resistive random access memory cells, measuring the resistances between the electrodes of each of the resistive random access memory cells, assigning a parameter value of zero to resistive random access memory cells with resistance measurements within a first predefined resistance threshold range, assigning a parameter value of one to resistive random access memory cells with resistance measurements within a second predefined resistance threshold range that is higher than the first predefined resistance threshold range, and generating a physically unclonable function response comprising parameter values, each of the parameter values representing one of the resistive random access memory cells, the physically unclonable function response uniquely identifying the electronic device.

In another embodiment, the secure processor may be configured to execute instructions for retrieving a physically unclonable function key from the secure server, and comparing the physically unclonable function key to the physically unclonable function response to determine a correlation between the physically unclonable function key and the physically unclonable function response.

In another embodiment, the secure processor may be configured to execute instructions for determining that the correlation between the physically unclonable function key and the physically unclonable function response exceeds a predefined threshold, and authenticating the device.

In another embodiment, the secure processor may be configured to execute instructions for assigning an arbitrary parameter value to resistive random access memory cells with resistance measurements within a third predefined resistance threshold range that is between the first and second predefined resistance threshold ranges; and assigning the arbitrary parameter value to resistive random access memory cells with resistance measurements above a predefined upper resistance threshold range that is above the second predefined resistance threshold range.

In another embodiment, each of the resistive random access memory cells may include a permanent conductive filament interposed between the electrodes of each of the resistive random access memory cells. For a given resistive random access memory cell of the resistive access memory cells, a temporary conductive path of the temporary conductive paths may extend between the permanent conductive filament and a bottom electrode of the electrodes corresponding to the given resistive random access memory cell.

In another embodiment, the array may be a conductive bridge random access memory array, a memristor memory array, or a phase change memory array.

In another embodiment, a temporary conductive path of the temporary conductive paths for a given resistive random access memory cell of the resistive random access memory cells may be formed between a top electrode and a bottom electrode of the given resistive random access memory cell, the temporary conductive being path formed from metallic positive ions such as copper or silver, elements with oxygen vacancies, crystallographic defects or doping elements, and a dielectric material manufactured with chalcogenide, tantalum oxide, silicon dioxide, hafnium oxide, or other solid electrolyte material.

In accordance with an example embodiment, a method of generating a physically unclonable function key may include exposing each cell of a random access memory array to an electric field to form temporary dissolvable conductive paths in dielectric material between electrodes of each of a plurality of resistive random access memory cells in the random access memory array, measuring, by a processor, the resistances of each of the plurality of resistive random access memory cells along the temporary conductive paths, assigning, by the processor, a parameter value of zero to resistive random access memory cells with resistance measurements within a first predefined resistance threshold range, assigning, by the processor, a parameter value of one to resistive random access memory cells with resistance measurements within a second predefined resistance threshold range that is higher than the first predefined resistance threshold range, generating, by the processor, a physically unclonable function key comprising parameter values, each of the parameter values representing one of the plurality of resistive random access memory cells, the physically unclonable function key uniquely identifying the random access memory array, and sending, by the processor, the physically unclonable function key to a secure server to be stored.

In another embodiment, the method may include assigning an arbitrary parameter value to resistive random access memory cells with resistance measurements within a third predefined resistance threshold range that is between the first and second predefined resistance threshold ranges, and assigning the arbitrary parameter value to resistive random access memory cells with resistance measurements above a predefined upper resistance threshold range that is above the second predefined resistance threshold range. The data stream may be a ternary data stream.

In another embodiment, for a given resistive random access memory cell of the plurality of resistive random access memory cells, the electric field may be generated by applying a gradually increasing electric current to at least one of the electrodes of the given resistive random access memory cell.

In another embodiment, the resistance of the given resistive random access memory cell along a temporary conductive path of the temporary conductive paths for the given resistive random access memory cell may be related to the electric current applied to the given resistive random access memory cell.

In another embodiment, the method may include forming, in each of the plurality of resistive random access memory cells, permanent filaments by applying a forming voltage to each resistive random access memory cell of the plurality of resistive random access memory cells. The temporary conductive paths may be formed in combination with the permanent filaments.

In another embodiment, a temporary conductive path of the temporary conductive paths for a given resistive random access memory cell of the plurality of resistive random access memory cells may be formed between a top electrode and a bottom electrode of the given resistive random access memory cell, the temporary conductive being path formed from metallic positive ions such as copper or silver, elements with oxygen vacancies, crystallographic defects or doping elements, and a dielectric material manufactured with chalcogenide, tantalum oxide, silicon dioxide, hafnium oxide, or other solid electrolyte material.

DETAILED DESCRIPTION

Embodiments of the present invention relate generally to physically unclonable functions (PUFS) and, more specifically, to PUFs based on attributes of Resistive RAM cells.

Memory based PUFs can be designed with SRAM, DRAMs, Flash RAMs, MRAM, and Resistive RAMS. When characterized, the cells within a memory array are subject to small manufacturing variations. A particular Parameter P can be selected to determine if the cells are characterized below the median value to generate "0"s or above for "1"s. When applied to a large number of cells, this can create a digital signature exploitable as part of a PUF. The use of PUFs with ternary values (0/1/X) has been developed to mask the "X" cells which are either close to the median value, or are instable, to reduce the probability that the measurement of parameter P will change overtime due to drifts such as temperature changes, electromagnetic noises, or aging. It can be expected that the cells falling close to the transition point can flip either ways, unlike the ones located far away from the transition. A method to reliably reduce any potential mismatches between challenge and response pairs would be necessary to reduce challenge-response pair (CRP) error rates to enhance the reliability of memory based PUFs for access control.

Figure 1:
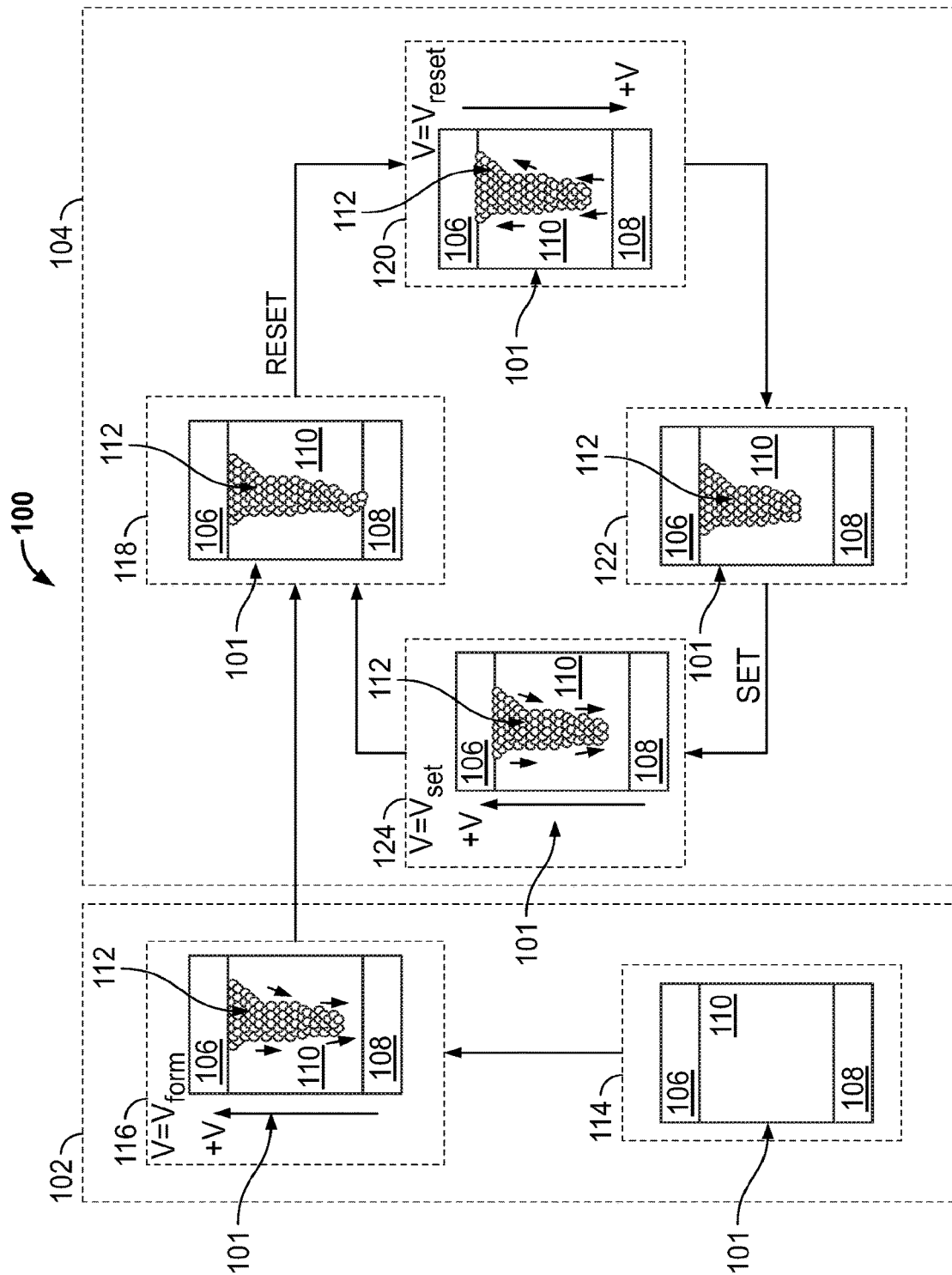
FIG. 1 is a schematic depicting the forming and programming of a Resistive RAM (ReRAM) array, in accordance with an embodiment.

Herein, the term "Resistive Random Access Memory", or ReRAM, is a generic term that includes, but is not limited by, Conductive Bridge RAM (CBRAM), Memristor, or phase change memory types. FIG. 1 shows an illustrative state diagram 100 depicting the transition of a given ReRAM cell 101 through various states as the cell undergoes forming, programming, and erasing processes. After forming, the cells of ReRAMs have two levels of resistance, the high resistance state (HRS) 122 to store a "1" and a low resistance state (LRS) 118 to store a "0". For example, the LRS may correspond to a resistance of about 5 kΩ and the HRS may correspond to a resistance of about 100 kΩ, whereas the resistance between the electrodes of the ReRAM cell 101 may have a resistance of 20 MΩ prior to forming. Each cell has an active top electrode 106, the anode, susceptible to the release positive ions (e.g., metallic ions or oxygen vacancies), a neutral bottom electrode 108, the cathode, and a dielectric 110 allowing the positive ions to migrate when subject to an electric field E. The electric field E is proportional to the voltage V applied between the two electrodes. The force $\mathcal{F}$ applied to the positive ions is proportional to the charge q of the ions and the voltage V:

$$\mathcal{F} = \alpha q V/d$$

with α being a constant, and d being the distance between the top electrode 106, and the bottom electrode 108.

During a forming cycle 102, sometimes referred to herein as the "forming cycle," all cells of a ReRAM device (e.g., including the ReRAM cell 101) are conditioned with the formation of a conductive filament 112, which reduces the resistance between the two electrodes 106 and 108. For example, the conductive filament 112 may include positive ions (e.g., metallic ions or oxygen vacancies) that migrate from the top electrode 106 when subject to an electric field generated when a voltage $V_{form}$ is applied across the top electrode 106 and the bottom electrode 108. In this way, the ReRAM cell 101 transitions from an "unformed" state 114 to a "formed" state 116. The energy needed during the forming cycle 102 is relatively high, and is part of the upfront conditioning of the ReRAM cell 101. It should be noted that the majority of the conductive filament 112 formed during the forming cycle 102 may be considered permanent, with the remaining portion of the conductive filament 112 forming a temporary conductive path that may be broken and re-formed via the application of positive or negative voltage across the top electrode 106 and the bottom electrode 108.

As shown, the subsequent program/erase cycles 104 involve the breaking or re-forming the conductive filament 112 to write a "0" (LRS), or a "1" (HRS). The energy needed to "reset", i.e., to break the filament, and to "set", i.e., re-form the filament is much lower than the energy that is needed in the forming process. For example, the ReRAM cell 101 may be in the logic "0" LRS 118 immediately after forming, with the conductive filament 112 providing an electrically conductive path between the top electrode 106 and the bottom electrode 108, and thereby lowering the resistance between the top electrode 106 and the bottom electrode 108. When it is desired to set the ReRAM cell 101 to a logic "high" state (e.g., the logic "1" FIRS 122), a reset voltage $V_{reset}$ may be applied between the top electrode 106 and the bottom electrode 108 during an intermediate resetting state 120. In the present example, $V_{reset}$ may generally be within a range of around −0.1 V to −0.3 V. During the intermediate resetting state 120, the ions of the conductive filament 112 may "break", moving away from the bottom electrode 108 as a result of the applied electric field. This breaking of the conductive filament 112 may increase the resistance between the top electrode 106 and the bottom electrode 108, causing the ReRAM cell 101 to enter the logic "1" FIRS 122. When it is desired to set the ReRAM cell 101 to a logic "low" state (e.g., the logic "0" HRS 118), a set voltage $V_{set}$ (sometimes referred to as a re-forming voltage) may be applied between the bottom electrode 108 and the top electrode 106 during an intermediate re-forming state 124. During the intermediate re-forming state 124, the ions of the conductive filament 112 may move back toward the bottom electrode 108 as a result of the applied electric field. This re-forming of the conductive filament 112 (e.g., to contact the bottom electrode 108) may decrease the resistance between the top electrode 106 and the bottom electrode 108, causing the ReRAM cell 101 to enter the logic "0" LRS 118.

Figure 2:
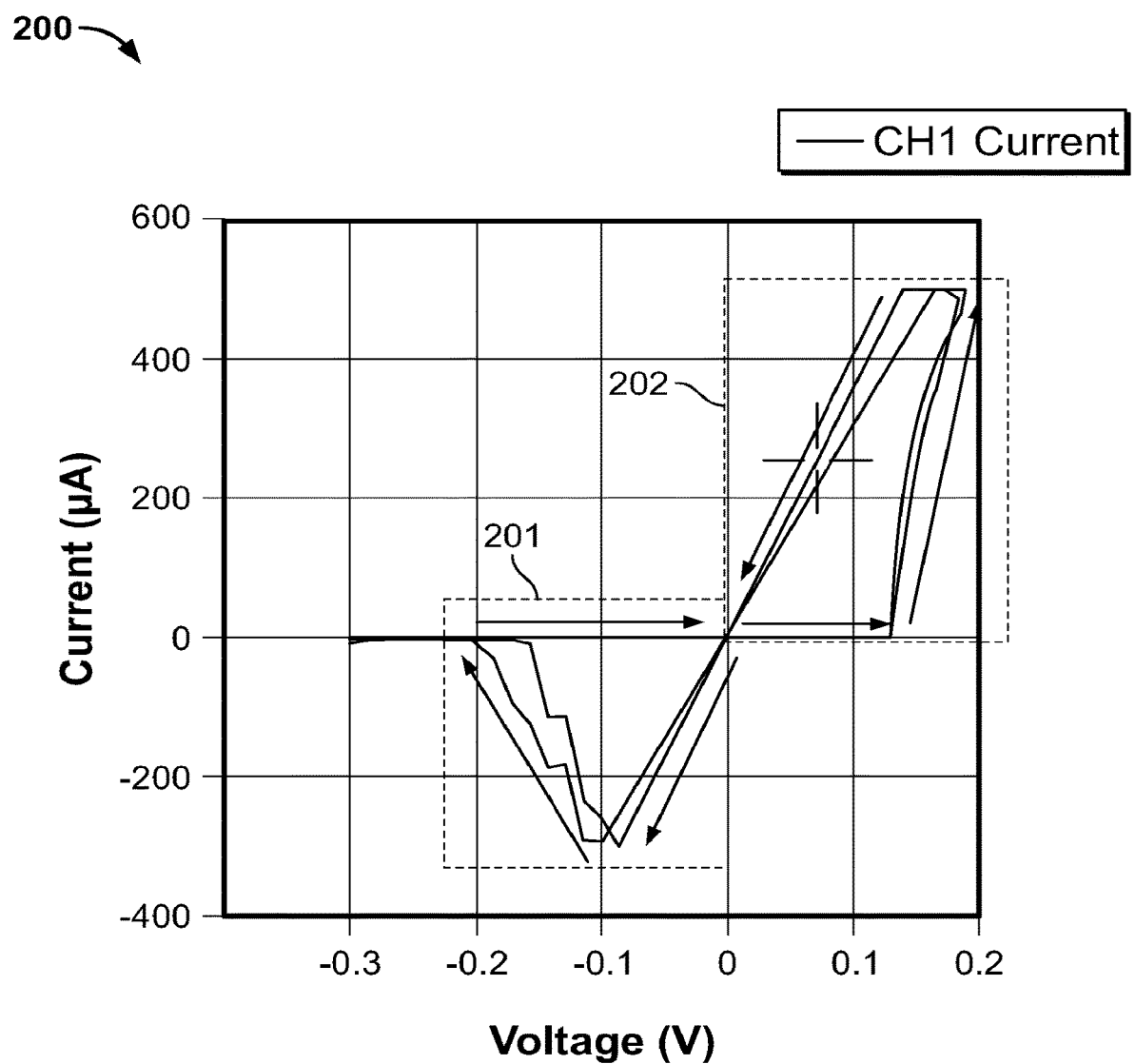
FIG. 2 shows an illustrative graph of a program and erase cycle of an Ag-based ReRAM cell, in accordance with an embodiment.

FIG. 2 shows a graph 200 (e.g., which may be generated using a semiconductor analyzer) showing current and voltage across a silver-based (Ag) ReRAM cell (e.g., ReRAM cell 101 of FIG. 1) during the re-forming of a conductive filament (e.g., conductive filament 112 of FIG. 1). Section 202 shows the voltage and current between the top and bottom electrodes of the ReRAM cell during re-forming. As shown in the section 202, voltage is increased to about 0.15V, where current begins to sharply increase as resistance across the electrodes decreases. The voltage is then lowered back down to 0V to end the re-forming process. In the present example about 0.15V, the $V_{set}$, and 100 μA may be required to re-form the conductive filament, and to reach the LRS (e.g., the LRS 118). Using different ReRAM samples with different elements, the $V_{set}$ can vary from around 0.1V to 3V, and the currents may vary around the 10-400 μA range. One method for re-forming the conductive filament is to sweep and ramp up a positive voltage. The current between the top and bottom electrodes will abruptly increase when the positive ions create a conductive filament connecting the top and bottom electrodes. During the voltage ramp, when the voltage has reached $V_{set}$, the positive ions of the conductive filament are constantly migrating in an unstable manner, increasing the size of the conductive filament. The resistance M of the cell may drop proportionally with the current circulating in the cell following the equation:

$$d\varphi = M(q) dq$$

with $\varphi$ being the magnetic flux: V dt=d$\varphi$ and t being the duration of the transition. This may create an avalanche effect, with the resistance during programing (e.g., during the re-forming state 124 of FIG. 1) dropping quickly in a manner that is generally difficult to control.

A negative voltage ramp (e.g., from 0 to at least $V_{reset}$) may subsequently be applied to the ReRAM cell to break the conductive filament and return the ReRAM cell to a high resistance state (e.g., FIRS 122 of FIG. 1). In section 204, the negative voltage ramp is applied, and the current increases from 0 to roughly −300 µA once the voltage reaches the $V_{reset}$ (roughly −0.1 V in the present example) before the magnitude of the current begins to decrease as the voltage is further increased to roughly −0.2V. Once the current returns to 0A while voltage is still applied, the ReRAM cell has returned to the logic "0" HRS.

Several parameters P may be considered candidates for the design of a PUF to exploit the cell-to-cell variations of ReRAM arrays to generate CRPs. As used herein, a CRP may be defined as a specific challenge and corresponding response used in the challenge-response authentication of a PUF with a given challenge corresponding to an initial response of the PUF (e.g., which may be stored in a memory of an authentication server), which may be compared to a response generated by a PUF in order to authenticate that PUF. It is important to note that the definition of "challenge" used herein may generally differ from conventional definitions. Specifically, the "challenge" referred to herein, may conventionally be referred to as an "initial response" of a PUF, the "response" referred to herein generally matches the conventional definition of "response" and refers to the output of a PUF in response to one or more specific inputs (conventionally, the "challenge"), and the application of current or voltage to ReRAM cells described herein takes the place of what would conventionally be referred to as a "challenge". In some embodiments, $V_{set}$ may be used as a parameter P. This may be beneficial because, as shown in FIG. 2, the current abruptly increases when the $V_{set}$ is reached during the voltage ramp, and $V_{set}$ is generally sensitive to manufacturing variations in the ReRAM cells, which is desirable for PUF design. Typical measurements of ReRAM cells typically observe $V_{set}$ to be roughly within a 0.5-1V range, and current to be roughly within a 10-100 µA range for about 5 to 40 µs. In some embodiments, the current may be limited (e.g., using a over-current protection circuit) to a maximum of 100 µA. In order to reset the ReRAM cell, a negative voltage (the $V_{reset}$) of about −1V is generally needed for about 1 µs and the current may be roughly 100 µA, which may drop to below roughly 50 µA when the filament breaks. The total energy needed for such a cycle (e.g., a set, forming the filament, followed by a reset, breaking the filament) is approximately 200 pJ.

In other embodiments, $V_{reset}$ may be used as a parameter P As shown in FIG. 2, $V_{reset}$, the voltage needed to reset a cell to High Resistance State (HRS) may be difficult to control.

In other embodiments, LRS and/or HRS resistances may be set as parameters P The resistance of LRS may generally be hard to control and can be erratic when subject to the repetitive queries of a PUF needed during repetitive access controls. HRS resistances are generally even more erratic because they are affected by the way the programming of the ReRAM cell was done.

Key figures of merit for a PUF are generally related to the protection of the secret information during challenge generation cycles, storage, and the authentication protocol. Conventional PUFs have intrinsic weaknesses that could be exploited by crypto-analysts using methods such as Differential Power Analysis (DPA), Electro Magnetic probes, or electron microscopy. In the future, these methods could be effective to extract a CRP from ReRAM device, depending on the variable used for the parameter P For example, when a particular ReRAM cell used to generate a CRP with $V_{set}$ as the parameter P is expected to have a "0" state response, the $V_{set}$ is lower than average (e.g., the average value of $V_{set}$ across all ReRAM cells in the ReRAM device), and the power needed to generate the response is also lower than average, which may be detectable by DPA techniques. The reverse is true for the cell with expected "1" state response in which the $V_{set}$ is higher than average and the power needed to generate the response is also higher than average. The 100 pJ needed to cycle/program a ReRAM cell is relatively small amount of power, however crypto-analysts could eventually develop a DPA method accurate enough to differentiate "0"s from "1"s.

Current electron microscopy methods do not have the ability to analyze the shape of ReRAM filaments when subject to repetitive program/erase cycles. However, the associated ion migration is significant enough to change the electrical properties of the cells. It has to be anticipated that with enough time and resources, sophisticated crypto-analysts will be able to extract CRPs from ReRAM arrays.

In view of the above, it would generally be desirable to develop ReRAM-based PUFs having CRPs that are not detectable by such crypto-analytic techniques.

Figure 3:
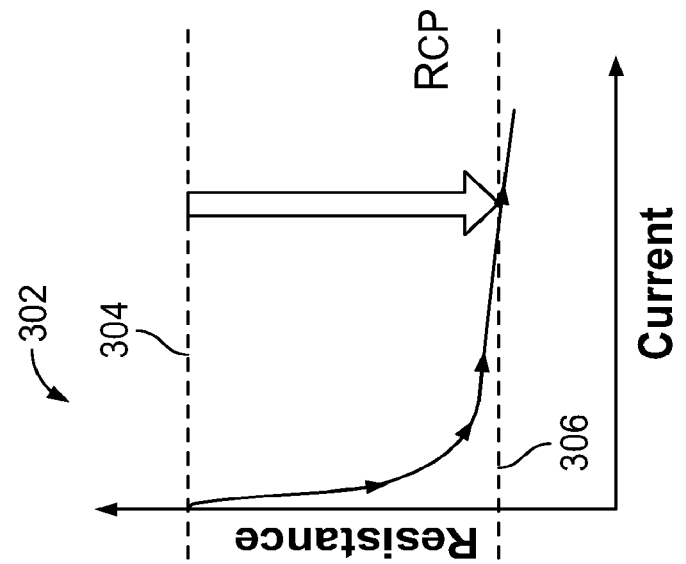
FIG. 3 shows illustrative graphs corresponding to current and resistance of a ReRAM cell during the formation of a dissolvable conductive path in the ReRAM cell via the controlled application of current, in accordance with an embodiment.
Figure 3:
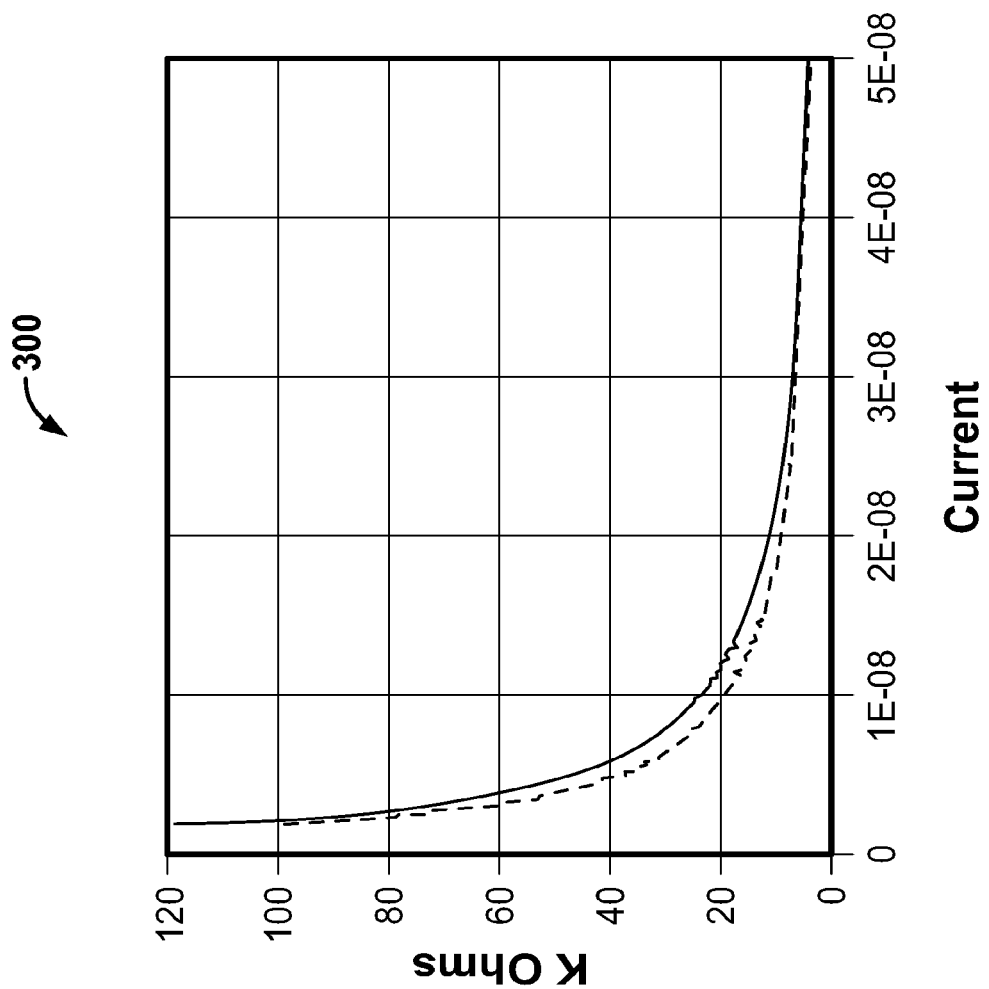

The method of programming/erasing a ReRAM cell (e.g., re-forming/breaking a conductive filament in the ReRAM cell) by ramping voltage to $V_{set}$ or $V_{reset}$ described above in connection with FIG. 2 triggers an avalanche effect that results in an abrupt increase of the current. FIG. 3 shows graphs 300 and 302 depicting the relationship between the current and resistance of an illustrative ReRAM cell (e.g., ReRAM cell 101 of FIG. 1) to which a current-controlled is applied in an alternative method of changing the resistance of the ReRAM cell. In particular, methods described herein are based on the application of a controlled current or controlled voltage, which may be fixed or ramped, in order to form a temporary conductive path between the end of a broken conductive filament and the lower electrode of the cell. In one illustrative example, a ramped current may be applied at an electrode of the cell with a variable current source). As show, when the current injected through the top and bottom electrodes (e.g., electrodes 106 and 108 of FIG. 1) of the ReRAM cell reaches a few nano-Amperes (1 $nA=10^{-9}$ A) the resistance of the ReRAM cell drops abruptly from a relatively high resistance (e.g., roughly 100 k$\Omega$; corresponding to a logic "1" state) to a relatively low resistance (e.g., less than about 10 k$\Omega$; corresponding to a logic "0" state) sometimes referred to as the conductive path resistance ($R_{CP}$), allowing the current to follow a gentler trajectory compared to that of the comparatively higher-power voltage ramping method corresponding to the graph 200 of FIG. 2, in which the filament is "permanently" re-formed. Specifically, the "permanent" reforming of the conductive filament previously described in connection with FIG. 2 may be distinguished from the formation of "temporary" conductive paths of the FIG. 3, which require comparatively less power to form, and which are "temporary" in that they dissipate or "dissolve" once the applied current or voltage ceases. The sample ReRAM cell used for the measurement presented in particular example embodiment of FIG. 3 was manufactured with Silver based elements, and subject to a forming cycle post-processing (e.g., forming cycle 102 of FIG. 1). The abrupt drop in resistance is the result of a physical change in the dielectric material separating the two electrodes, along with the formation of a conductive path. The dielectric material of ReRAM cells usually contains metallic ions such as silver or copper and microscopic defects. When subject to an electric field, the metallic ions and defects get somewhat organized to create a conductive path (e.g., conductive filament 112 of FIG. 1). After the initial creation of this path, more ions, and defects migrate to enlarge the path and the resistance changes proportionally with the flux going through the structure.

It is noticeable that in this method (referred to herein as the "temporary conductive path method"), the current circulating through the dielectric is orders of magnitude lower than the current circulating during the method of programming of the cell shown in FIG. 2 (referred to herein as the "permanent conductive path method"). Specifically, the temporary conductive path method requires a current of around 20 nA versus the permanent conductive path method, which requires a current of around 10-100 μA. The peak voltage of the temporary conductive path method is also orders of magnitude lower than that of the permanent conductive path method, for example around 500 μV versus around 800 mV. These lower values mean the time needed to ramp up current to form a dissolvable, temporary conductive path is faster than the time needed to ramp voltage to form a stable, permanent filament. The total electric power involved in the measurement is therefore minuscule with the temporary conductive path method compared with the one needed to program the cell using the permanent conductive path method.

It should be noted that, about quickly as the current returns to zero, the resistance of the ReRAM cell returns to its initial value with little or no indication of prior stress. The temporary conductive paths created during the prior cycles are quickly dissolved when the electric field applied to the structure returns to zero. Repetitive cycles performed on a large number of cells are reproducible with the exception of a small number of cells that are erratic, most likely due to localized defects. Additional details of this process are explained below.

The formation of conductive paths into the cells of ReRAM arrays, with methods such as those described above, can be exploited to design PUFs and to generate reliable CRPs. Several parameters P can be used as a basis for the PUF-authentication of a given ReRAM device, specifically to in the generation of CRPs for such authentication. One example of parameter P is the resistance of a ReRAM cell's $R_{CP}$ (e.g., the resistance between the top electrode 106 and the bottom electrode 108 of the ReRAM cell 101 in the LRS 118 of FIG. 1) when a dissolvable conductive path is created (e.g., according to the current ramping method depicted in FIG. 3). $R_{CP}$ can be measured when a predetermined fixed current is being applied to a given ReRAM cell.

Figure 4:
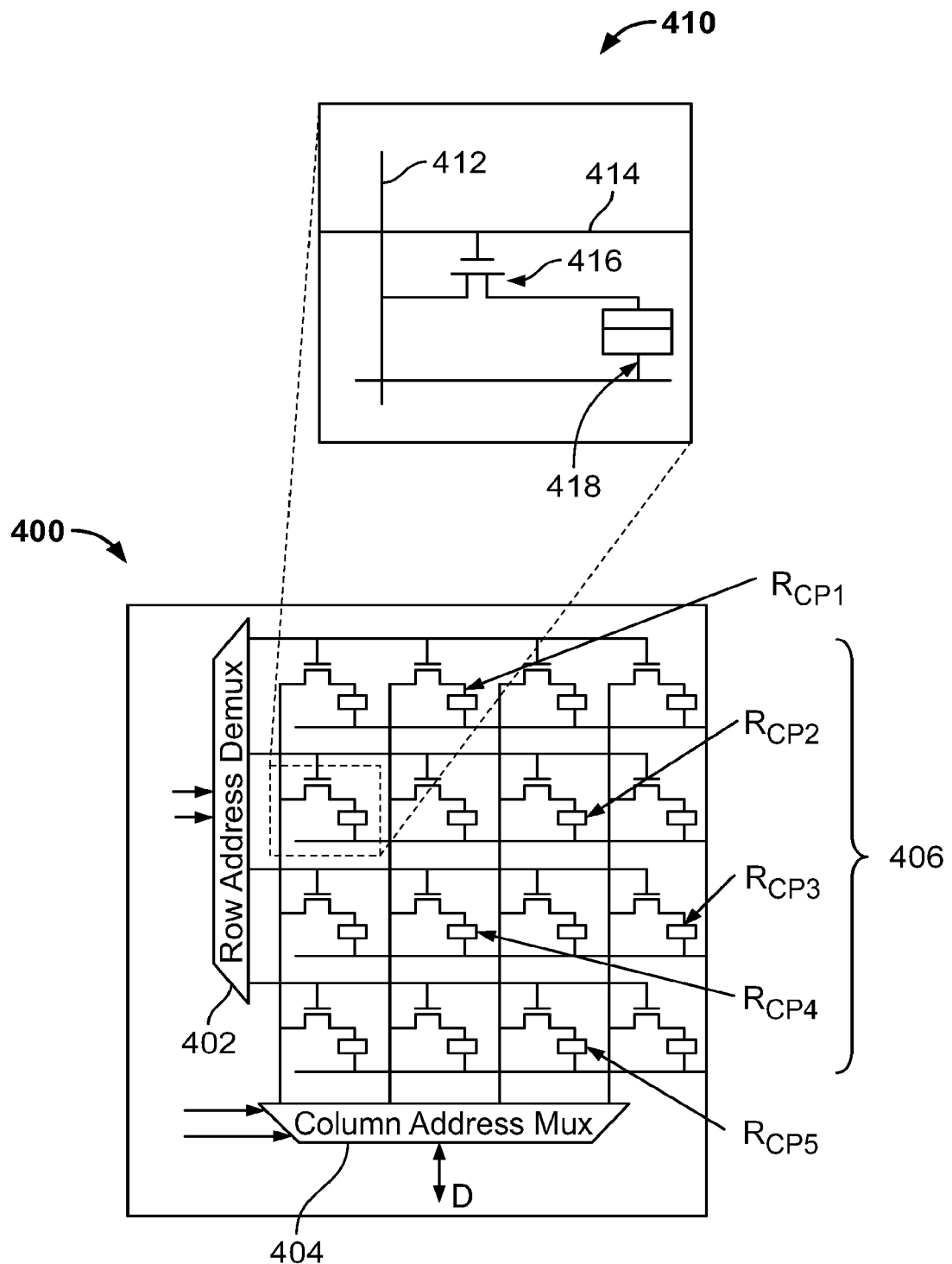
FIG. 4 is a diagram of an illustrative system that includes an array of ReRAM cells having dissolvable conductive paths, in accordance with an embodiment.

FIG. 4 shows a ReRAM device 400 that includes an array 406 of ReRAM cells 410, each having a respectively different $R_{CP}$ value. Specifically, $R_{CP}$ can vary from cell to cell to generate a "fingerprint" of the array comprised of values of $R_{CP1}$, $R_{CP2}$, $R_{CP3}$, . . . , which can be used as the parameter P when generating CRPs for the authentication of the ReRAM device 400. The ReRAM device may further include a row address demultiplexer 402 and a column address multiplexer 404, which may selectively control the application of voltage and current to each of the ReRAM cells 410. For example, when one of the ReRAM cells 410 in a particular row and column is selected, the row address demultiplexer 402 may apply a voltage to the control terminal (e.g., gate terminal) of a transistor 416 via a row wordline 414, and the column address multiplexer 404 may receive a signal via a bitline 412 corresponding to the $R_{CP}$ of that ReRAM cell.

Several attributes may be considered when evaluating the merits of a PUF that uses $R_{CP}$ as parameter P. First, repeatability may be considered, which describes how stable $R_{CP}$ measurements (e.g., responses) of the same ReRAM cell are over time when the ReRAM cell (or the device comprising the ReRAM cell) is subjected to repeated queries. A "good" PUF is generally stable and consistently repeatable in order to keep CRP error rates low.

Differentiation may also be considered, which describes how different ReRAM cells with distinct $R_{CP}$ measurements can be identified from each other due to manufacturing variations in the ReRAM cells. A "good" PUF will generally have high entropy (e.g., manufacturing variability) to provide un-clonability and non-predictive variations cell to cell (i.e., high differentiation).

Protection from crypto-analysts is important. A "good" PUF makes it difficult for a third party to extract responses (e.g., the $R_{CP}$ in the present example) from a PUF. During side-channel analysis, or when the device is "lost to the enemy", the PUF should ideally retain its secrecy.

Figure 5:
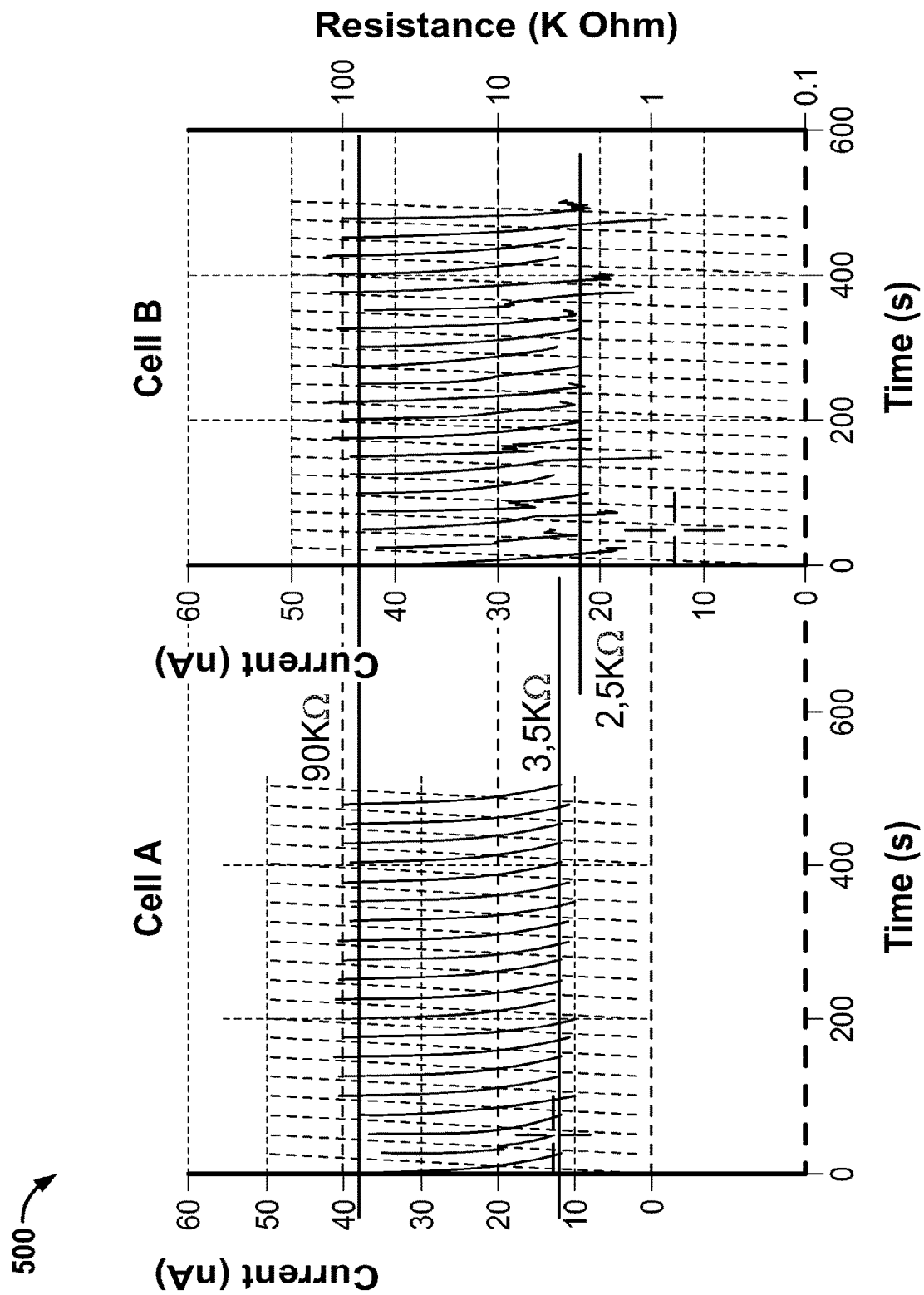
FIG. 5 shows an illustrative graph depicting the resistance values of two different Ag-based ReRAM cells that have undergone forming, as electric current is cycled through each cell, in accordance with an embodiment.

FIG. 5 shows a graph 500 depicting the results (e.g., resistance and current over time) of the characterization of two silver-based (Ag) ReRAM cells, Cell A and Cell B (e.g., each corresponding to an embodiment of the ReRAM cell 101 of FIG. 1), when subjected to 20 successive cycles of generating conductive paths via the temporary conductive path method described previously. Cell A and Cell B were characterized after going through an initial forming and a reset cycle (e.g., forming cycle 102 and resetting state 120 of FIG. 1). This characterization process may sometimes be referred to herein as "post-forming temporary conductive path formation". During each cycle, the current injected into the two cells gradually increases over 25 seconds from 0 to 50 nA. The resistance of each cell is plotted concurrently with the current. In each cycle, the resistance abruptly dropped from about 90 KΩ to about 3 KΩ, with Cell A having an average $R_{CP}$ of about 3.5 KΩ and Cell B having an average $R_{CP}$ of about 2.5 KΩ. The resistance returns to the high value when the cycle is over, and the 20 successive cycles are shown to be substantially similar to each other for a given ReRAM cell. As shown, Cell A is significantly different from Cell B, with a higher average $R_{CP}$. A similar pattern was observed over a large population of silver-based ReRAM cells, with all the cells being substantially unique and differentiable, which is generally a desirable attribute when designing strong PUFs, as described above. Quicker measurements, in the 1 μs range or lower per cycle, may be performed with integrated electronic system. In some embodiments, to enhance the quality of the PUF, challenges, and responses can be generated by averaging several consecutive $R_{CP}$ measurements, for example 20 measurements in one embodiment, to eliminate the effect of the small variations.

Figure 6:
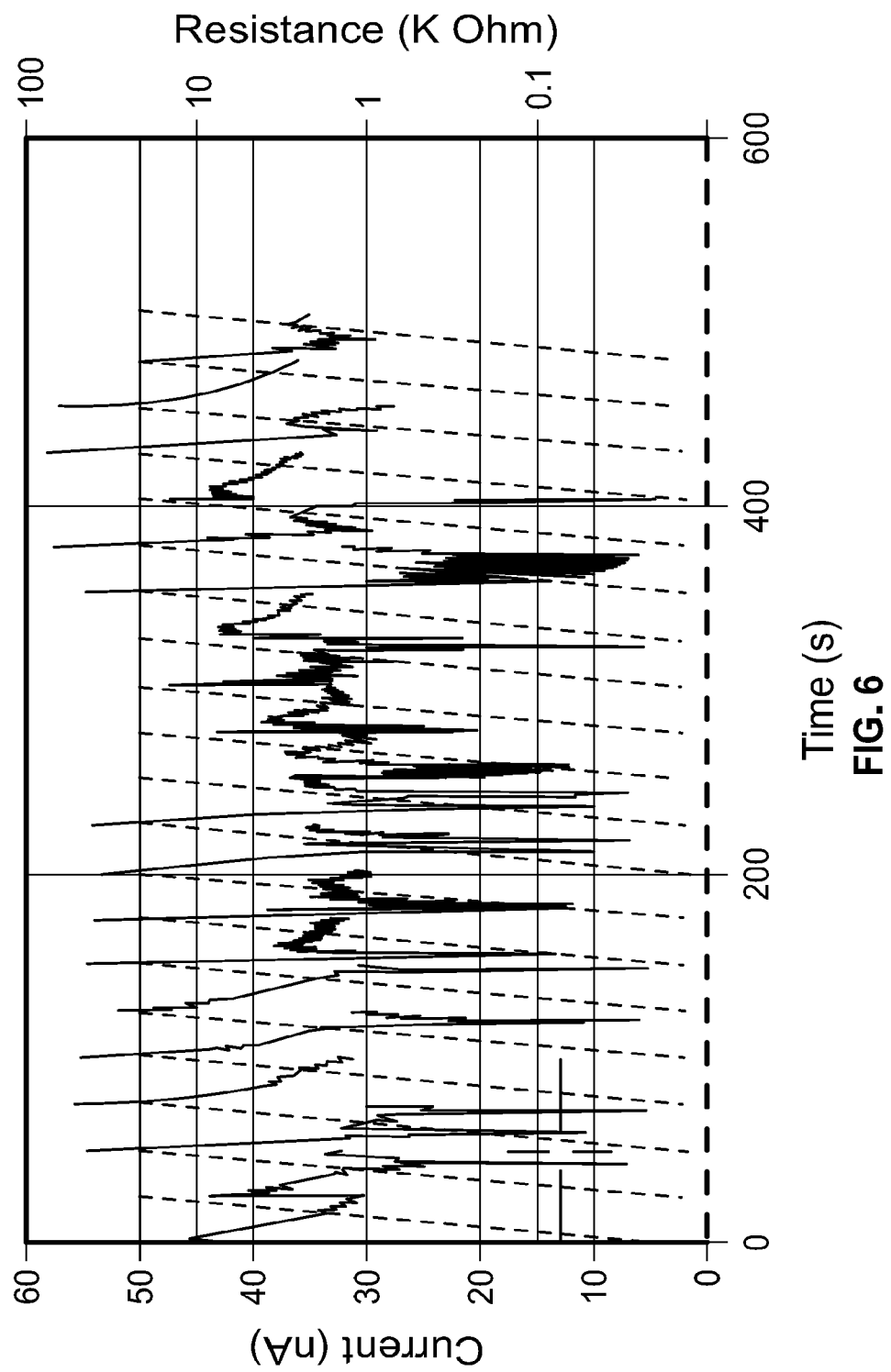
FIG. 6 shows an illustrative graph depicting the resistance values of an erratic Ag-based ReRAM cell that has undergone forming, as electric current is cycled through the cell, in accordance with an embodiment.

Generally, the majority of ReRAM cells characterized in this way have been found to exhibit a stable and predictable response, as shown above in FIG. 5. However some cells are erratic (e.g., due to manufacturing defects). FIG. 6 shows a graph 600 depicting the results (e.g., the resistance and current over time) of the characterization of such an erratic cell. In this case, general resistance behavior of the cell and, more specifically $R_{CP}$, may be erratic. As an example, for the PUF authentication of a ReRAM device containing one or more of these erratic ReRAM cells, the erratic responses (e.g., such responses being identified as "erratic" when the average $R_{CP}$ value of the ReRAM cell exceeds a predefined threshold when $R_{CP}$ is used as the parameter P) of such cells may defined as an "unstable" state, which may be denoted as "X", corresponding to neither a logic "1" or a logic "0", which enables ternary-state-based PUF authentication. The use of ternary states in the generation of CRPs and the corresponding use of such CRPs to authenticate PUFs allows the masking of such erratic cells and the design of PUFs with low CRP error rates. The erratic cells may also be a good source of randomness to design true random numbers generators (TRNG).

Figure 7:
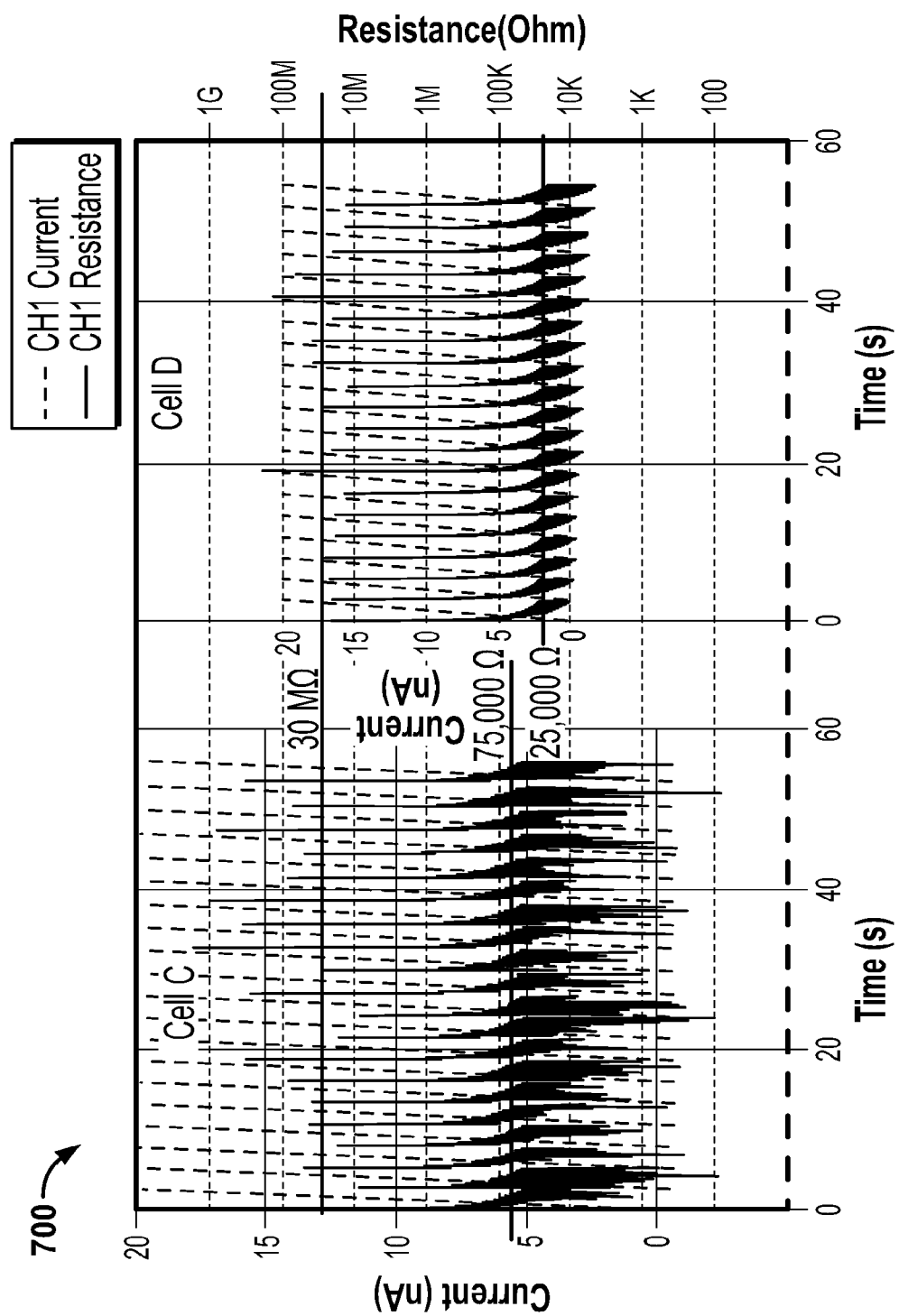
FIG. 7 shows an illustrative graph depicting the resistance values of two Cu-based ReRAM cells that have not undergone forming, as electric current is cycled through each cell, in accordance with an embodiment.

In another embodiment, temporary conductive path formation may be performed on ReRAM cells that have not yet undergone a forming cycle (e.g., forming cycle 102 of FIG. 1). FIG. 7 shows a graph 700 depicting the results (e.g., resistance and current over time) of the characterization of two copper-silica based ReRAM cells, Cell C and Cell D, (e.g., each corresponding to an embodiment of the ReRAM cell 101 of FIG. 1), when subjected to 20 successive cycles of generating conductive paths via the temporary conductive path method described previously. The cells were characterized without going through an initial high energy forming process (e.g., forming cycle 102 of FIG. 1). This characterization process may sometimes be referred to herein as "pre-forming temporary conductive path formation". During each cycle, the current injected in the cells is gradually increased over 2.5 seconds from 0 to 50 nA. The resistance of each cell is plotted concurrently with the current. In each cycle, the resistance abruptly drops from about 30 MΩ to about 30 KΩ, with Cell C having an average $R_{CP}$ of about 75 KΩ and Cell D having an average $R_{CP}$ of about 25 KΩ. The resistance differences from high to low are much higher than in embodiments in which formation of the temporary conductive path is performed after forming of the conductive filament. Similar to the post-forming temporary conductive path formation embodiments described previously, ReRAM cell resistances also return to the high resistance value (e.g., 30 MΩ in the case of a ReRAM cell that hasn't undergone a forming cycle) when the cycle is over (e.g., when current returns to zero), and the 20 successive cycles are again very similar to each other for a given ReRAM cell. As shown, the resistance behavior of Cell C is substantially different from Cell D. Large cell-to-cell variation over a large population of cells was also observed with pre-forming temporary conductive path formation, which is generally desirable to design strong PUFs, as described previously. Quicker measurements, in the 1 µs range per cycle or lower, can be performed with integrated electronic systems. The PUF, challenges, and responses can be generated by averaging several consecutive $R_{CP}$ measurements, 20 for example, to eliminate the effect of the small variations, and to increase the quality of the PUFs.

In the configuration of this embodiment, the vast majority of the cells characterized are again stable, and predictable, as shown in FIG. 7. However, some ReRAM cells may also be erratic prior to forming, which may enable the use of ternary states for CRP generation and PUF authentication, as described above.

In an example embodiment, copper-silica conductive ReRAM cells were tested using the pre-forming temporary conductive path formation method described above. Twenty successive measurements of $R_{CP}$ were performed on each ReRAM cell of two separate tiles. Results of this testing are presented in Table 1, below:

TABLE 1

| | $R_{CP}$ (ohm) @ 20 nA | | | |
|---|---|---|---|---|
| Tile#/Cell # | Mean $R_{CP}$ | $R_{CP}$ Standard Deviation | Mean Correlation | PUF State |
| 5/01 | 13000 | 3200 | 0.98 | 1 |
| 5/02 | 6000 | 5100 | 0.52 | 0 |
| 5/03 | 9900 | 5600 | 0.91 | 0 |
| 5/04 | 10100 | 2000 | 0.95 | 0 |
| 5/05 | 12900 | 2600 | 0.96 | 1 |
| 5/06 | 11700 | 1600 | 1.00 | 0 |
| 5/07 | 11500 | 7000 | 0.79 | X |
| 5/08 | 11800 | 2700 | 0.97 | X |
| 5/09 | 11500 | 4700 | 0.88 | 0 |
| 5/10 | 10400 | 3600 | 0.90 | 0 |
| 5/11 | 12800 | 3500 | 0.96 | 1 |
| 5/12 | >100K | >100K | 0.26 | X |
| 6/01 | >100K | >100K | 0.35 | X |
| 6/02 | 15000 | 1000 | 1.00 | 1 |
| 6/03 | 6800 | 1300 | 0.99 | 0 |
| 6/04 | 13300 | 3100 | 0.96 | 1 |
| 6/05 | 9500 | 4200 | 0.93 | 0 |
| 6/06 | 15500 | 5300 | 0.73 | 1 |
| 6/07 | 14200 | 5400 | 0.84 | 1 |
| 6/08 | 13000 | 3300 | 0.97 | 1 |
| 6/09 | 14200 | 1300 | 1.00 | 1 |
| 6/10 | 13100 | 1800 | 0.99 | 1 |
| 6/11 | >1M | >1M | 0.21 | X |
| 6/12 | 13200 | 1400 | 1.00 | 1 |

As shown, the ternary PUF challenges (e.g., the initial responses that may be stored in memory and that may be compared to subsequent responses of the PUF when authenticating the PUF) of tile 5 and tile 6 are:

Tile 5: (1, 0, 0, 0, 1, X, X, 0, 0, 1, X)
Tile 6: (X, 1, 0, 1, 0, 1, 1, 1, 1, X, 1)

The statistical level of correlation is measured from 0 (no correlation) to 1 (certain correlation). The cells masked with an X are considered to be either unstable (e.g., above a predefined threshold $R_{CP}$ average) or too close to the buffer of a neutral area (e.g., in this embodiment the neutral area of the $R_{CP}$ average being within the range of 11.7-12.7 KΩ). Defining unstable or buffer-region ReRAM cell average $R_{CP}$ values (e.g., parameter values) as "X" rather than "1" or "0", enables ternary PUF authentication, which may have reduced CRP error rates. However, it should be understood that the use of ternary parameter states in the present example is intended to be illustrative and not limiting. In some embodiments, binary CRPs may instead be used for PUF authentication.

Figure 8:
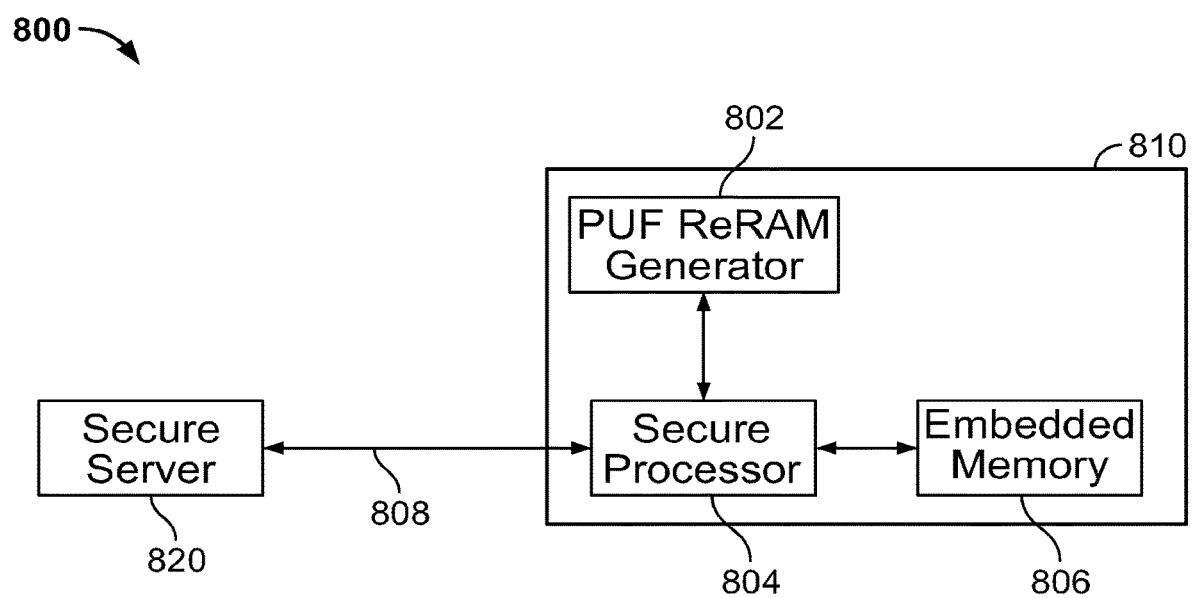
FIG. 8 is a diagram of an illustrative system for physically unclonable function (PUF) verification, in accordance with an embodiment.

FIG. 8 illustrates a block diagram of an implementation of an authentication system 800 that utilizes PUFs, such as those which may be derived from ReRAM cells (e.g., ReRAM cell 101 of FIG. 1), which may, for example, use $R_{CP}$ as the parameter P in connection with pre-forming or post-forming temporary conductive path formation CRP generation methods, as described above. As shown, a device 810 seeking authentication may be coupled to a secure server 820 via a connection 808, and may include a PUF ReRAM generator 802, a secure processor 804, and an embedded memory 806. In some embodiments, the connection 808 may be a direct wired or wireless connection (e.g., a serial cable, an Ethernet cable, a WiFi connection, etc.), while in other embodiments, the connection 808 may represent an electronic communications network made up of multiple connections and devices (e.g., the Internet).

With the ReRAM-based PUF authentication architecture shown, PUF responses are extracted from the PUF ReRAM memory generator 802 (e.g., including one or more ReRAM devices each having an array of ReRAM cells, where each ReRAM device may correspond to the ReRAM device 400 of FIG. 4) by applying power (e.g., current ramping; 0 to 50 nA over 25 seconds for ReRAM cells that have undergone forming; 0 to 50 nA over 2.5 seconds for ReRAM cells that have not undergone forming) to the cells of the PUF ReRAM memory generator 802. These responses may then be provided to the secure processor 804 of the device 810. The secure processor 804 may perform a comparison of the responses generated by the PUF ReRAM generator 802 with a stored PUF key (e.g., corresponding to the previously generated challenge [i.e., expected or initial response] of the PUF ReRAM generator 802), which may be provided to the secure processor 804 for by the secure server 820 and stored in the embedded memory 806. The embedded memory 806 may, for example, be a non-transitory computer-readable memory, such as a hard-disk drive, a solid-state drive, or flash memory. In alternate embodiments, this comparison may be performed at the secure server 820. If the responses generated by the PUF ReRAM generator 802 substantially match the stored PUF key (e.g., above a predefined correlation threshold), the device 810 will be successfully authenticated.

Figure 9:
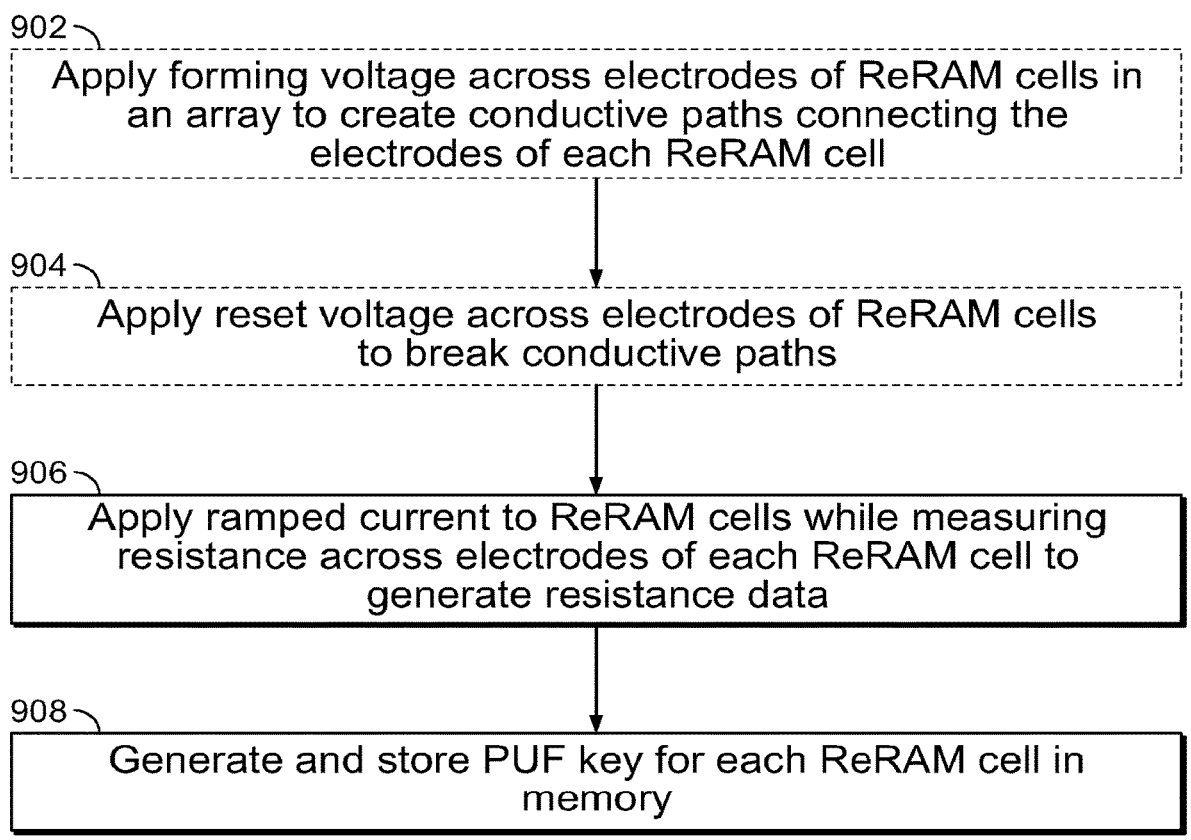
FIG. 9 is a process flow for an illustrative method of generating challenge data for a ReRAM-based PUF, in accordance with an embodiment.

FIG. 9 shows a method of generating a PUF key for the authentication of an electronic device (e.g., device 810 of FIG. 8). First, it should be noted that steps 902 and 904 may be optional, and may only be necessary in the post-forming temporary conductive path formation embodiment described above. For the pre-forming temporary conductive path formation embodiment, steps 902 and 904 may be skipped.

At step 902, a forming voltage $V_{form}$ may optionally be applied across top and bottom electrodes (e.g., top electrode 106 and bottom electrode 108 of FIG. 1) of each of an array (e.g., array 406 of FIG. 4) of ReRAM cells (e.g., ReRAM cells 101 and 410 of FIGS. 1 and 4) of the electronic device. Step 902 may, for example, correspond to the forming cycle 102 of FIG. 1 for each ReRAM cell in the array. In this way, a conductive filament (e.g., conductive filament 112 of FIG. 1) may be formed between the electrodes of each ReRAM cell, thereby creating a conductive path between the electrodes.

At step 904, a reset voltage $V_{reset}$ may optionally be applied across the top and bottom electrodes of each of the array of ReRAM cells of the electronic device in order to break the conductive paths formed at step 902. Step 904 may, for example, correspond to the intermediate resetting state 120, and may cause each of the ReRAM cells to enter the HRS 122 of FIG. 1.

At step 906, a predetermined amount of ramped current (e.g., from 0 to 50 nA) may be applied to the ReRAM cells of the electronic device, and the minimum resistance (e.g., the $R_{CP}$) across the electrodes of each of the ReRAM cells is measured (e.g., using a processor such as the secure processor 804 of FIG. 8) to generate resistance data. In some embodiments, the ramped current may be applied to each ReRAM cell over multiple cycles (e.g., 10 or 20 cycles), and the generated resistance data for a given ReRAM cell may correspond to an average $R_{CP}$ value of that cell across the multiple cycles. For a given cycle, the ramped current may be applied for a predetermined amount of time (e.g., 2.5 seconds for pre-forming temporary conductive path formation, or 25 seconds for post-forming temporary conductive path formation) before proceeding to the next cycle or ending step 906. In some embodiments, instead of ramped current, a fixed current, a fixed voltage, or a ramped voltage may be applied, as long as the magnitude of such currents or voltages is sufficiently high to form a temporary conductive path (e.g., around 50 nA or around 0.1-0.3 V) without being so high as to form a permanent conductive path (e.g., around 100 μA or around 1 V).

At step 908, a PUF key may be generated based on the resistance data generated for each ReRAM cell in step 906. For example, the processor may generate the PUF key by assigning respective parameter values to each ReRAM cell of the array of ReRAM cells of the electronic device. In some embodiments, for a given ReRAM cell, the processor may assign a parameter value of "0" to that ReRAM cell if the resistance of the ReRAM cell is below a predefined resistance threshold value, and may assign a parameter of "1" to that ReRAM cell if the resistance of the ReRAM cell is above the predefined resistance threshold value, thereby generating a binary PUF key. In an alternate embodiment, for a given ReRAM cell, the processor may assign a parameter value of "0" to that ReRAM cell if the resistance of the ReRAM cell is within a first predefined resistance threshold range (e.g., corresponding to a range of comparatively "lower" resistance values), may assign a parameter of "1" to that ReRAM cell if the resistance of the ReRAM cell is within a second predefined resistance threshold range (e.g., corresponding to a range of comparatively "higher" resistance values), and may assign an arbitrary parameter of "X" to that ReRAM cell if the resistance of the ReRAM cell is "unstable", meaning that the resistance above an upper resistance threshold value or that the resistance of the ReRAM cell is within a third predefined resistance threshold range (e.g., corresponding to a range of comparatively "intermediate" resistance values) between the first and second predefined resistance threshold ranges, thereby generating a ternary PUF key. The processor may generate the PUF key as a data stream of these parameter values for each ReRAM cell of the array. The PUF key may be stored in a memory device (e.g., a memory device of a secure server, such as the secure server 820 of FIG. 8) of the electronic device. This PUF key may be subsequently retrieved from the memory device (e.g., by the processor) when attempting to authenticate the electronic device, as will be described below.

Figure 10:
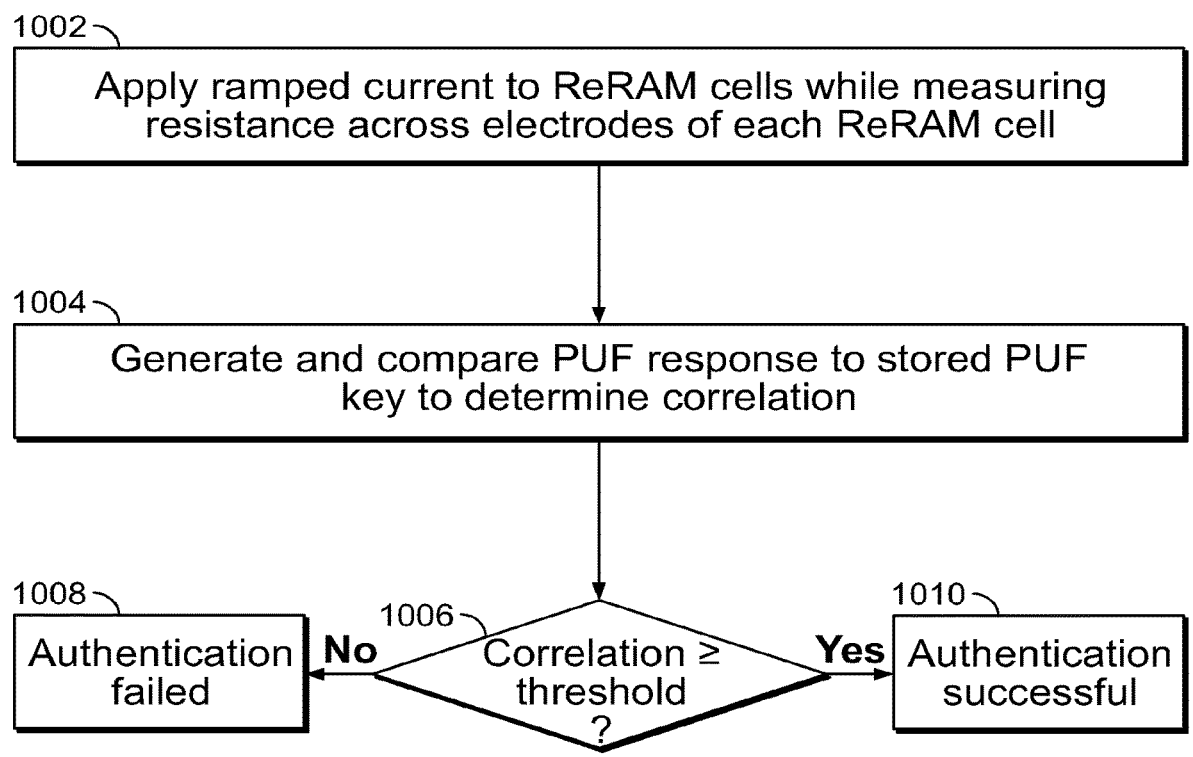
FIG. 10 is a process flow for an illustrative method of generating challenge data for a ReRAM-based PUF, in accordance with an embodiment.

FIG. 10 shows a method of authenticating an electronic device (e.g., device 810 of FIG. 8) by generating a PUF response and comparing that PUF response to a stored PUF key.

At step 1002, a predetermined amount of ramped current (e.g., from 0 to 50 nA) may be applied to the ReRAM cells (e.g., by a power supply within or coupled to the electronic device, with a ramp rate that may be defined by a computer processor, such as the secure processor 804 of FIG. 8) of the electronic device, and the minimum resistance (e.g., the $R_{CP}$) across the electrodes of each of the ReRAM cells may be measured by at least a processor of the electronic device (e.g., the secure processor 804 of FIG. 8) to generate resistance data. In some embodiments, the ramped current may be applied to each ReRAM cell over multiple cycles (e.g., 10 or 20 cycles), and the generated resistance data for a given ReRAM cell may correspond to an average $R_{CP}$ value of that cell across the multiple cycles. For a given cycle, the ramped current may be applied for a predetermined amount of time (e.g., 2.5 seconds for pre-forming temporary conductive path formation, or 25 seconds for post-forming temporary conductive path formation) before proceeding to the next cycle or ending step 1002. In some embodiments, instead of ramped current, a fixed current, a fixed voltage, or a ramped voltage may be applied, as long as the magnitude of such currents or voltages is sufficiently high to form a temporary conductive path (e.g., around 50 nA or around 0.1-0.3 V) without being so high as to form a permanent conductive path (e.g., around 100 μA or around 1 V).

At step 1004, a PUF response may be generated based on the resistance data generated in step 1002. For example, the processor may generate the PUF response by assigning respective parameter values to each ReRAM cell of the array of ReRAM cells of the electronic device. In some embodiments, for a given ReRAM cell, the processor may assign a parameter value of "0" to that ReRAM cell if the resistance of the ReRAM cell is below a predefined resistance threshold value, and may assign a parameter of "1" to that ReRAM cell if the resistance of the ReRAM cell is above the predefined resistance threshold value, thereby generating a binary PUF response. In an alternate embodiment, for a given ReRAM cell, the processor may assign a parameter value of "0" to that ReRAM cell if the resistance of the ReRAM cell is within a first predefined resistance threshold range (e.g., corresponding to a range of comparatively "lower" resistance values), may assign a parameter of "1" to that ReRAM cell if the resistance of the ReRAM cell is within a second predefined resistance threshold range (e.g., corresponding to a range of comparatively "higher" resistance values), and may assign an arbitrary parameter of "X" to that ReRAM cell if the resistance of the ReRAM cell is "unstable", meaning that the resistance is above an upper resistance threshold value or that the resistance of the ReRAM cell is within a third predefined resistance threshold range (e.g., corresponding to a range of comparatively "intermediate" resistance values) between the first and second predefined resistance threshold ranges, thereby generating a ternary PUF response. The processor may generate the PUF response as a data stream of these parameter values for each ReRAM cell of the array. The PUF response may then be compared to a PUF key (e.g., the PUF key generated at step 908 of FIG. 9). For example, the PUF key may be retrieved by the processor (e.g., the secure processor 804 of FIG. 8) of the electronic device from a memory device of a secure server (e.g., the server 820 of FIG. 8), and the processor compare the PUF response to the PUF key.

At step 1006, the processor may compare the PUF response to the PUF key to determine a correlation between the two. If the correlation between the PUF response and the PUF key meets or exceeds a predefined correlation threshold, the method proceeds to step 1010 and the electronic device is successfully authenticated. Otherwise, if the correlation between the PUF device and the PUF key is less than the predefined correlation threshold, the method proceeds to step 1008 and the authentication of the electronic device fails.

It should be understood a PUF key generation method similar to that of FIG. 9 may be performed in advance of the method of FIG. 10 in order to enable the PUF authentication of the electronic device.

Conventional PUF technologies are often exposed to side channel analysis, such as analysis after fault injection and physical attacks. In addition, conventional PUF technology may occupy a large circuit footprint, which generally increases cost, and their size may allow modern crypto-analysts to easily analyze the PUF structure. In contrast, embodiments of the ReRAM-based PUFs described herein may be considered attractive because they are difficult to crypto-analyze due to the small size of individual ReRAM cells. For example, the cells of ReRAM arrays (e.g., array 406 of FIG. 4) are about 20 times smaller than the cells of SRAM arrays that are currently widely used for conventional PUF CRP generation. However, the energy needed for CRP generation from ReRAM PUFs using $V_{set}$ as parameter P (e.g., in connection with the permanent conductive path formation method described previously) can be very high compared with SRAM (e.g., 1 μW for some SRAM PUFs compared to around 80 μW for $V_{set}$-based ReRAM PUFs). When $R_{CP}$ is chosen as parameter P, however, ReRAM PUFs may have a power consumption of around 0.1 nano-Watts, which is orders of magnitude lower than $V_{set}$-based ReRAM PUFs or SRAM PUFs.

Generally, $V_{set}$-based ReRAMs need about 2 nJ per bit for PUF CRP generation. In contrast, when $R_{CP}$ is chosen as the parameter P, and the post-forming temporary conductive path formation process is used, the energy needed for CRP generation is on the order of magnitude of one million times lower, in the 1 femto-Joule range. When the pre-forming temporary conductive path formation process is used, the energy needed is even lower (e.g., in the in the 0.5 femto-Joule range) because the formation of the dissolvable conductive path can occur on a much faster timescale. Both the power consumption and energy required with either embodiment of ReRAM PUFs for which $R_{CP}$ is chosen as the parameter P is comparatively much lower than any known conventional method of PUF CRP generation.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

We claim:

1. A method of generating a physically unclonable function response, the method comprising:
   exposing each cell of a random access memory array to an electric field to form temporary dissolvable conductive paths in dielectric material between electrodes of each of a plurality of resistive random access memory cells in the random access memory array;
   measuring the resistances of each of the plurality of resistive random access memory cells along the temporary conductive paths;
   assigning a parameter value of zero to resistive random access memory cells with resistance measurements within a first predefined resistance threshold range;
   assigning a parameter value of one to resistive random access memory cells with resistance measurements within a second predefined resistance threshold range that is higher than the first predefined resistance threshold range; and
   generating a data stream of parameter values, each parameter value representing one of the plurality of resistive random access memory cells, the data stream being used to generate a physically unclonable function response that uniquely identifies the random access memory array, wherein, for a given resistive random access memory cell of the plurality of resistive random access memory cells, the electric field is generated by applying a gradually increasing electric current to at least one of the electrodes of the given resistive random access memory cell.

2. The method of claim 1, further comprising:
assigning an arbitrary parameter value to resistive random access memory cells with resistance measurements within a third predefined resistance threshold range that is between the first and second predefined resistance threshold ranges; and
assigning the arbitrary parameter value to resistive random access memory cells with resistance measurements above a predefined upper resistance threshold range that is above the second predefined resistance threshold range, wherein the data stream is a ternary data stream.

3. The method of claim 1, wherein the resistance of the given resistive random access memory cell along a temporary conductive path of the temporary conductive paths for the given resistive random access memory cell is related to the electric current applied to the given resistive random access memory cell.

4. The method of claim 1, further comprising:
forming, in each of the plurality of resistive random access memory cells, permanent filaments by applying a forming voltage to each resistive random access memory cell of the plurality of resistive random access memory cells, wherein the temporary conductive paths are formed extending from the permanent filaments.

5. The method of claim 1, wherein the random access memory array is selected from a group consisting of: a conductive bridge random access memory array, a memristor memory array, and a phase change memory array.

6. The method of claim 1, wherein a temporary conductive path of the temporary conductive paths for a given resistive random access memory cell of the plurality of resistive random access memory cells is formed between a top electrode and a bottom electrode of the given resistive random access memory cell, the temporary conductive being a path formed from a material selected from at least one of: metallic positive ions such as copper or silver, elements with oxygen vacancies, crystallographic defects or doping elements, and a dielectric material manufactured with chalcogenide, tantalum oxide, silicon dioxide, hafnium oxide, and other solid electrolyte material.

7. A system comprising:
a secure server;
an electronic device communicatively coupled to the secure server, the electronic device comprising:
an array comprising resistive random access memory cells;
a secure processor coupled to the array, the secure processor configured to execute instructions for:
causing a gradually increasing current to be applied to each of the resistive random access memory cells to form temporary dissolvable conductive paths in dielectric material between electrodes of each of the resistive random access memory cells;
measuring the resistances between the electrodes of each of the resistive random access memory cells;
assigning a parameter value of zero to resistive random access memory cells with resistance measurements within a first predefined resistance threshold range;
assigning a parameter value of one to resistive random access memory cells with resistance measurements within a second predefined resistance threshold range that is higher than the first predefined resistance threshold range; and
generating a physically unclonable function response comprising parameter values, each of the parameter values representing one of the resistive random access memory cells, the physically unclonable function response uniquely identifying the electronic device.

8. The system of claim 7, wherein the secure processor is further configured to execute instructions for:
retrieving a physically unclonable function key from the secure server; and
comparing the physically unclonable function key to the physically unclonable function response to determine a correlation between the physically unclonable function key and the physically unclonable function response.

9. The system of claim 8, wherein the secure processor is further configured to execute instructions for:
determining that the correlation between the physically unclonable function key and the physically unclonable function response exceeds a predefined threshold; and
authenticating the electronic device.

10. The system of claim 7, wherein the secure processor is further configured to execute instructions for:
assigning an arbitrary parameter value to resistive random access memory cells with resistance measurements within a third predefined resistance threshold range that is between the first and second predefined resistance threshold ranges; and
assigning the arbitrary parameter value to resistive random access memory cells with resistance measurements above a predefined upper resistance threshold range that is above the second predefined resistance threshold range.

11. The system of claim 7, wherein each of the resistive random access memory cells comprises a permanent conductive filament interposed between the electrodes of each of the resistive random access memory cells, and wherein, for a given resistive random access memory cell of the resistive access memory cells, a temporary conductive path of the temporary conductive paths extends between the permanent conductive filament and a bottom electrode of the electrodes corresponding to the given resistive random access memory cell.

12. The system of claim 7, wherein the array is selected from a group consisting of: a conductive bridge random access memory array, a memristor memory array, and a phase change memory array.

13. The system of claim 7, wherein a temporary conductive path of the temporary conductive paths for a given resistive random access memory cell of the resistive random access memory cells is formed between a top electrode and a bottom electrode of the given resistive random access memory cell, the temporary conductive being path formed from a material selected from at least one of: metallic positive ions such as copper or silver, elements with oxygen vacancies, crystallographic defects or doping elements, and a dielectric material manufactured with chalcogenide, tantalum oxide, silicon dioxide, hafnium oxide, and other solid electrolyte material.

14. A method of generating a physically unclonable function key, the method comprising:
exposing each cell of a random access memory array to an electric field to form temporary dissolvable conductive paths in dielectric material between electrodes of each of a plurality of resistive random access memory cells in the random access memory array;

measuring, by a processor, the resistances of each of the plurality of resistive random access memory cells along the temporary conductive paths;

assigning, by the processor, a parameter value of zero to resistive random access memory cells with resistance measurements within a first predefined resistance threshold range;

assigning, by the processor, a parameter value of one to resistive random access memory cells with resistance measurements within a second predefined resistance threshold range that is higher than the first predefined resistance threshold range;

generating, by the processor, a physically unclonable function key comprising parameter values, each of the parameter values representing one of the plurality of resistive random access memory cells, the physically unclonable function key uniquely identifying the random access memory array; and sending, by the processor, the physically unclonable function key to a secure server to be stored, wherein, for a given resistive random access memory cell of the plurality of resistive random access memory cells, the electric field is generated by applying a gradually increasing electric current to at least one of the electrodes of the given resistive random access memory cell.

15. The method of claim 14, further comprising:

assigning an arbitrary parameter value to resistive random access memory cells with resistance measurements within a third predefined resistance threshold range that is between the first and second predefined resistance threshold ranges; and assigning the arbitrary parameter value to resistive random access memory cells with resistance measurements above a predefined upper resistance threshold range that is above the second predefined resistance threshold range, wherein the data stream is a ternary data stream.

16. The method of claim 14, wherein the resistance of the given resistive random access memory cell along a temporary conductive path of the temporary conductive paths for the given resistive random access memory cell is related to the electric current applied to the given resistive random access memory cell.

17. The method of claim 14, further comprising:

forming, in each of the plurality of resistive random access memory cells, permanent filaments by applying a forming voltage to each resistive random access memory cell of the plurality of resistive random access memory cells, wherein the temporary conductive paths are formed in combination with the permanent filaments.

18. The method of claim 14, wherein a temporary conductive path of the temporary conductive paths for a given resistive random access memory cell of the plurality of resistive random access memory cells is formed between a top electrode and a bottom electrode of the given resistive random access memory cell, the temporary conductive being path formed from a material selected from at least one of: metallic positive ions such as copper or silver, elements with oxygen vacancies, crystallographic defects or doping elements, and a dielectric material manufactured with chalcogenide, tantalum oxide, silicon dioxide, hafnium oxide, and other solid electrolyte material.

* * * * *